July 25, 1944.  H. M. McCOY  2,354,392
INTEGRATED MODEL AIRPLANE
Filed Sept. 30, 1942   5 Sheets-Sheet 1

Inventor
Howard M. McCoy
Maréchal & Noe
By
Attorneys

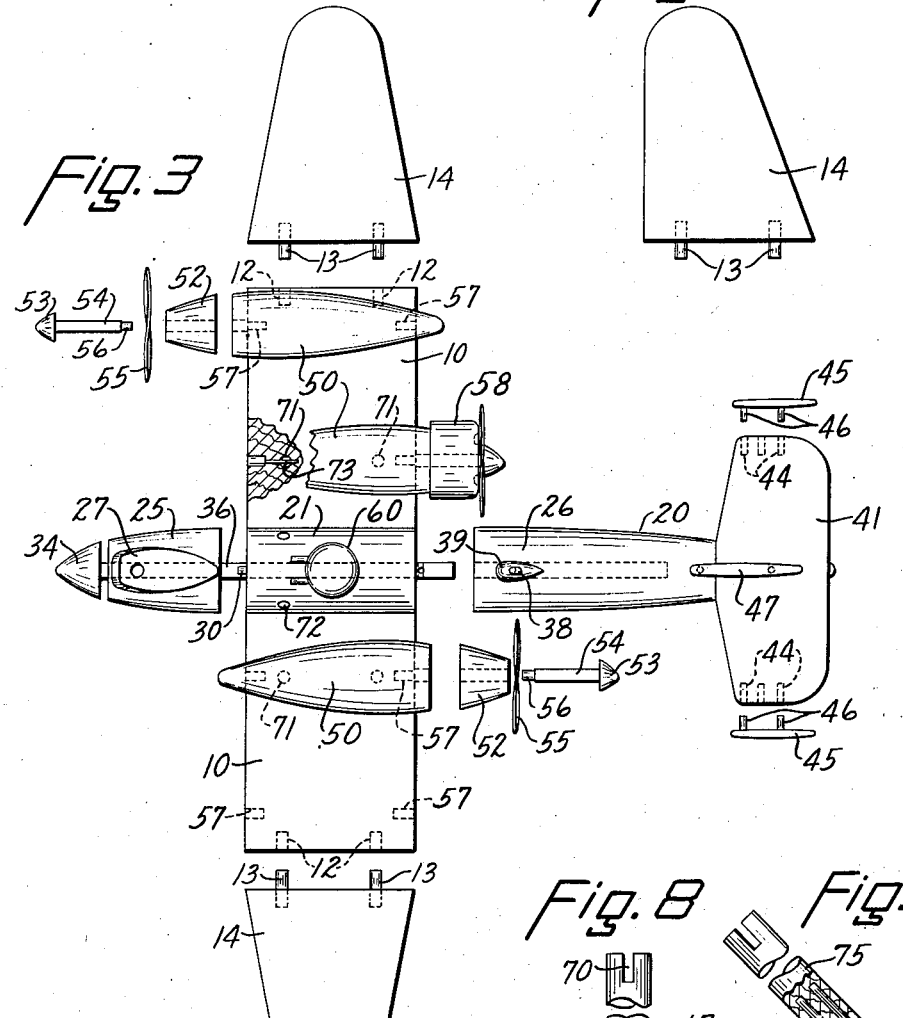

July 25, 1944.  H. M. McCOY  2,354,392
INTEGRATED MODEL AIRPLANE
Filed Sept. 30, 1942  5 Sheets-Sheet 3
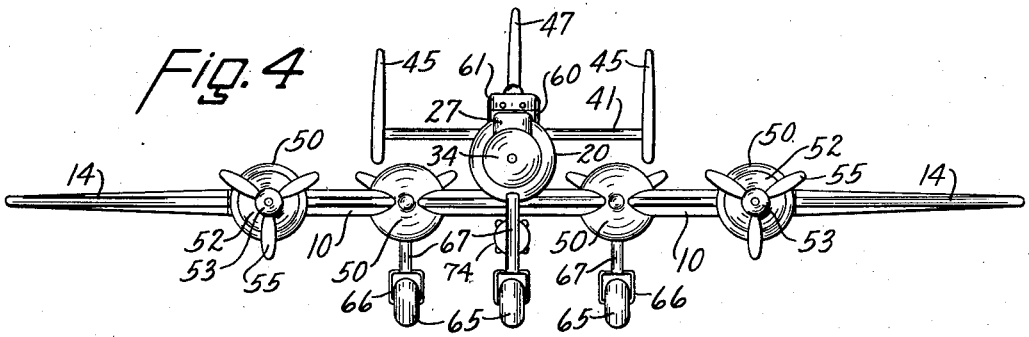
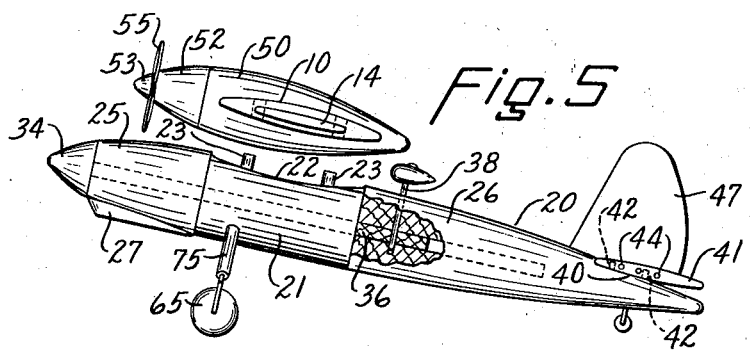
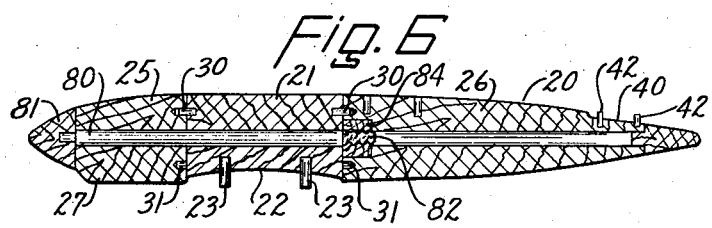
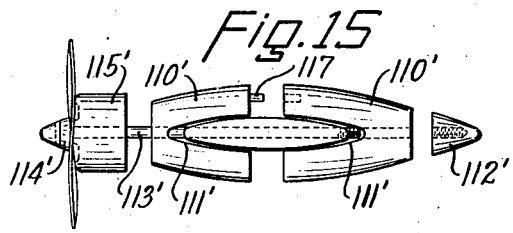
Inventor
Howard M. McCoy
By Marechal & Noe
Attorneys July 25, 1944.  H. M. McCOY  2,354,392
INTEGRATED MODEL AIRPLANE
Filed Sept. 30, 1942  5 Sheets-Sheet 4
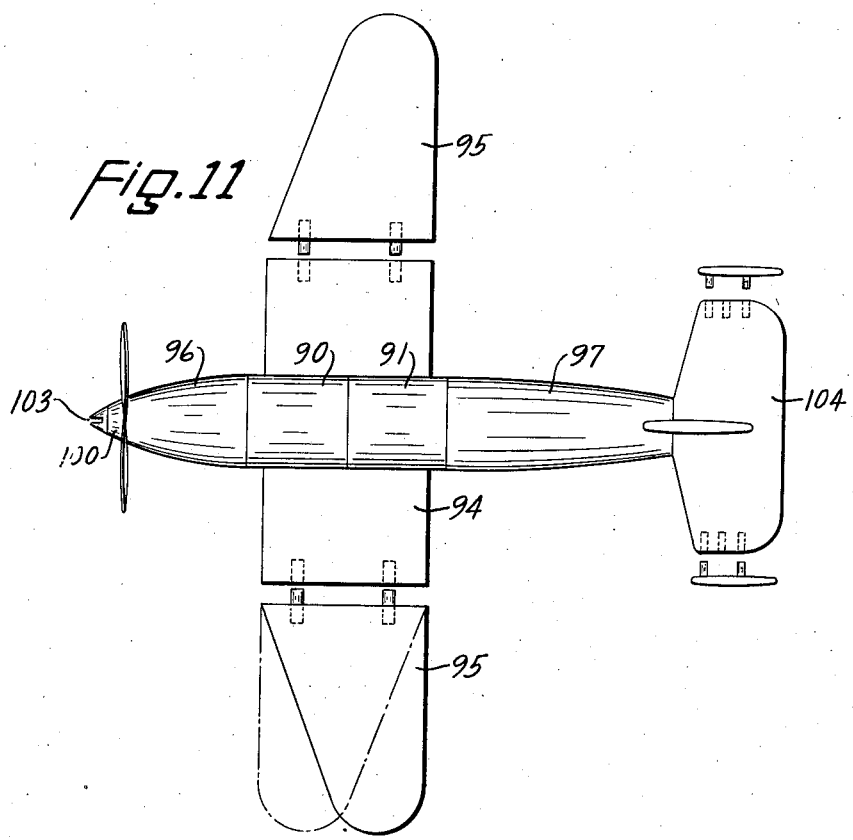
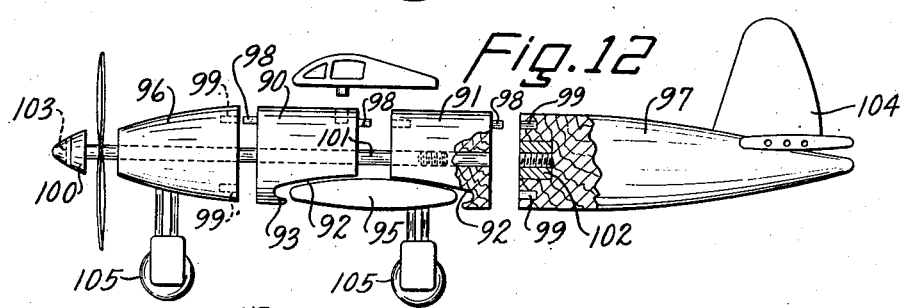
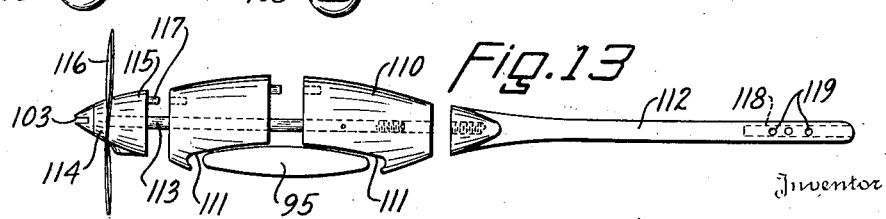
Inventor
Howard M McCoy
By
Marechal & Noe
Attorneys

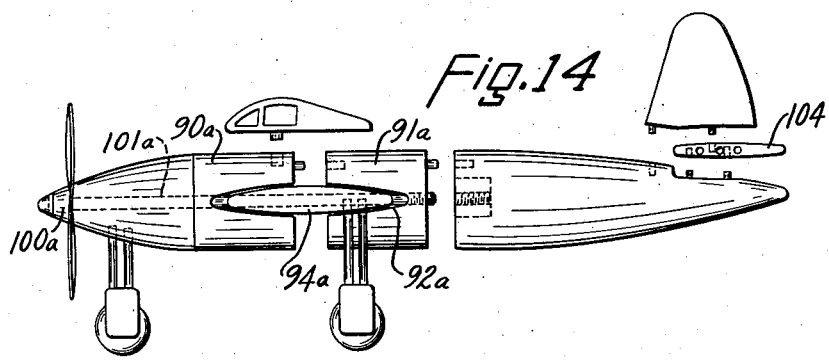
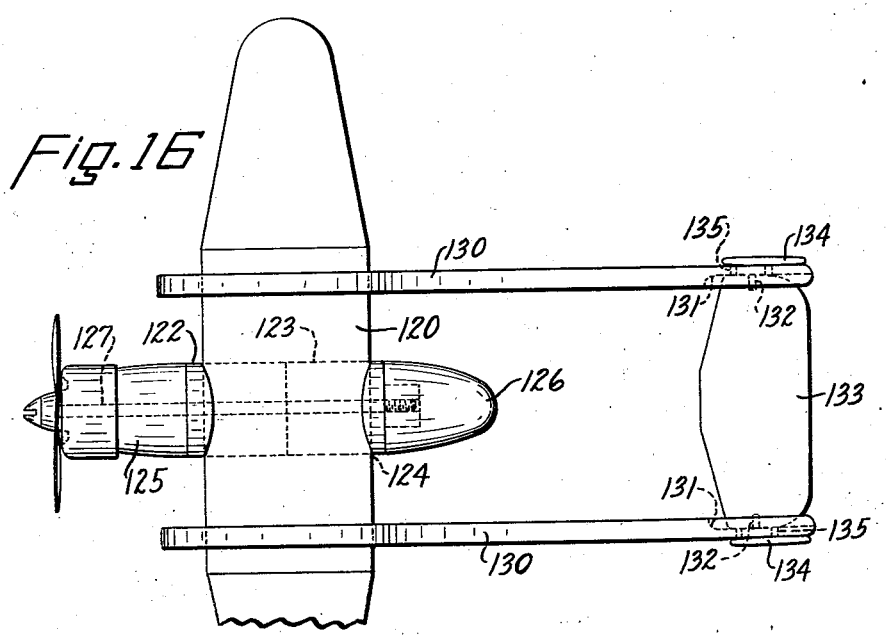
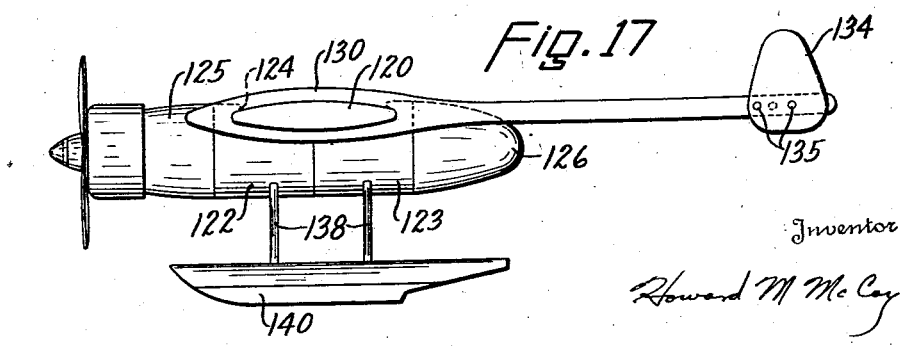

Patented July 25, 1944

2,354,392

UNITED STATES PATENT OFFICE 2,354,392

INTEGRATED MODEL AIRPLANE

Howard M. McCoy, Patterson Field, Ohio

Application September 30, 1942, Serial No. 460,236

5 Claims. (Cl. 46—76)

(Granted under the act of March 3, 1883, as amended April 30, 1928; 370 O. G. 757)

This invention relates to integrated model airplanes.

It is the principal object of the invention to provide a limited number of integrated model airplane parts which are so correlated and constructed that they may be assembled in a large number of different ways to provide accurate models of a large number of different types of airplanes.

It is a further object to provide such a set of parts which under the exercise of the ingenuity and imagination of the user may be assembled in different groups and in different ways to simulate a large number of different planes.

It is a still further object to provide a set of model airplane parts which may be manufactured easily and cheaply in large quantities, which are of rugged and substantial construction to withstand severe handling in use, and which are quickly and easily assembled and reassembled into different varying combinations closely simulating a large number of different types of aircraft.

Other objects and advantages will be apparent from the following description, the accompanying drawings, and the appended claims.

This invention, if patented, may be manufactured and used by or for the Government for governmental purposes without the payment to the patentee of any royalty thereon. This stipulation is hereby made a part of the patent, if granted.

In the drawings,

Fig. 3 is a plan view in exploded form showing the construction which provides for detachably securing and assembling the parts together;

Fig. 3A is a detail view of a modified form of detachable wing tip;

Fig. 4 is a forward head-on view of the assembled plane of Fig. 1;

Fig. 5 is a side elevational view of the parts in a different relationship simulating a high-wing plane with certain of the parts being separated to show the construction;

Fig. 6 is a vertical sectional view along the axis of the assembled body parts showing the construction thereof;

Fig. 7 is a detail view of an engine nacelle in exploded form simulating a liquid cooled or in-line engine;

Fig. 8 is a detail view showing the construction of the landing gear assembly;

Fig. 9 is a similar view of a modified landing gear;

Fig. 10 is a detail view of the landing gear strut in the direction of the arrows 10—10 of Fig. 8;

Fig. 11 is a plan view of a modified construction in which the parts are assembled to simulate a single engine low-wing monoplane;

Fig. 12 is a side elevational view in exploded form of the construction shown in Fig. 11;

Fig. 13 is a side elevational view in exploded form showing the assembly of an in-line engine nacelle adapted for use with this construction and having a boom extending rearwardly therefrom;

Fig. 14 is a side elevational view in exploded form showing the body parts constructed to simulate a mid-wing monoplane and assembled with the remaining parts in such manner;

Fig. 15 is an exploded side elevational view of a radial engine nacelle adapted for assembly into the mid-wing form of plane;

Fig. 16 is a plan view of the parts assembled to simulate a single radial engine high-wing tractor plane with a boom tail and equipped with pontoons; and Fig. 17 is a side elevational view of the assembly shown in Fig. 16.

Figure 1:
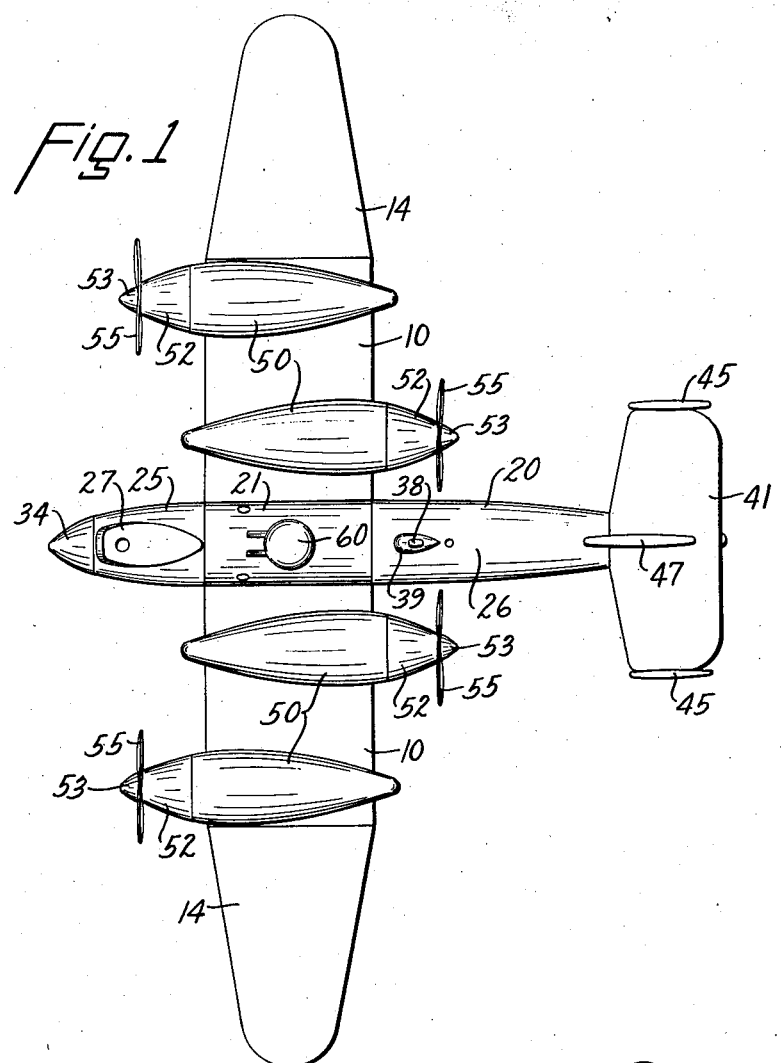
Fig. 1 is a view in plan of one assembly of the parts made in accordance with this invention representing a four-motor low wing plane having two tractor motors and two pusher motors.

Referring to the drawings Figs. 1 to 4 show a typical assembly of the parts into the form of a four engine plane, the wing section of which appears at 10. This is a main wing section the cross-section of which is shown in the side elevational view of Fig. 2. As therein illustrated, it is seen that the wing is symmetrical in cross-section, the curvature of the forward half of the surface being the same as that of the rear half. Further it will be clear from the showing in Fig. 3 that this main section 10 is likewise symmetrical in plan form.

A large or elongated main section 10 is provided as shown for simulating the larger multiengine aircraft, and if desired there may be also provided a shorter section likewise symmetrical both in plan form and in section for the purpose of simulating smaller aircraft of the single engine or less than four-engine type where the main wing is of less span.

The main wing section 10 is provided with a pair of apertures 12 located in similarly spaced relation at each end and adapted to receive dowel pins 13 which are fixedly secured in tip sections 14. Thus the tip sections can be detachably secured at the ends of the main wing section, can be interchanged end for end, and can likewise be assembled in inverted relation at the same end. Likewise the same tip sections can be assembled upon any other main wing section 10 of different length which may be provided.

The tip sections 14 shown in Figs. 1 and 3 are symmetrical in plan form and when assembled on the main wing section, simulate a wing the inner section of which is straight and the outer section of which is both tapered and swept back. Such construction is desirable when for example it is desired to produce the parts from wood or like material by a cutting operation. In this operation, and through the provision of a single rotary cutter, the upper and lower main wing surfaces can be cut in a continuous manner by passing a blank through the suitably shaped female cutting part. Similarly these symmetrical tip sections 14 can be likewise cut by passing blanks through the same cutter but in an inclined direction so that the tapering section shown is secured. It will be clear however that tip sections such as shown in Fig. 3A may likewise be provided in which one edge of the tip is straight and the other tapered, so that such tips can be assembled on the main section in either of two inverted positions to provide different wing contours as desired.

The fuselage of the plane is indicated generally at 20 and comprises a plurality of body parts which are relatively elongated and contoured to simulate the usual airplane fuselage. As shown in Figs. 5 and 6, one of these parts, 21, is provided with a recess adjacent one side thereof shown at 22, the shape of this recess being the same as that of the wing section. This requires use of a male cutter, the same cutter being used for cutting such other similar recesses as required. The recess is also symmetrical so that it is adapted to receive the wing section in either of two relatively inverted positions thereof. Projecting upwardly from the body part are a pair of dowel pins 23 which are equally spaced, and extend into the recess 22, being adapted to be received in similarly formed apertures in main wing section 10. These apertures are provided on both top and bottom surfaces of the wing section so that the wing can be assembled on the body part with either its top or bottom surface adjacent the body, and likewise reversed end for end.

A forward body part 25 and a rear body part 26 are arranged to be assembled on either side of the central body portion 21, being shaped in usual contour to simulate the main fuselage part of the plane. If desired a projection 27 may be formed on one side of the forward part 25 simulating a cooling radiator element or the like. This projection 27 may also simulate a cabin enclosure on multi-engined models when inverted as shown in Fig. 3.

The central body section 21 is provided with locating pins 30 projecting outwardly from opposite ends thereof, and the forward and rear body parts 25 and 26 are respectively provided with two apertures 31 in either one of which the respective pin 30 is adapted to be received. This combination thus provides for centering and locating the body parts in assembled relation in either of two positions where the main section is rotated through 180° with respect to either the forward or rear sections.

A nose part 34 is provided to which is attached a rod or pin 36 which is adapted to pass through a central aperture in the body sections 25, 21, and 26. The rod 36 is formed with a transverse aperture adjacent its remote end, and a locking pin 38 is adapted to be inserted through an aperture in body section 26 and through the corresponding aperture in the end of rod 36, to thereby retain the parts in the assembled relationship shown. If desired a streamline element 39 may be provided on the pin 38 to limit its downward travel and to simulate a radio compass loop enclosure.

The tail surfaces are adapted to be detachably mounted on the rear body portion 26, such portion being recessed as shown at 40 the surface of the recess being shaped with the same curvature as that of recess 22 and by means of the same cutter. The stabilizer is shown at 41 and as is the case with the wing section, is cut by the same female wing cutter, and is symmetrical about both axes so that it can be assembled in two alternate positions relatively inverted. The body section 26 is provided with pins 42 for receiving the stabilizer, the stabilizer in turn having a plurality of apertures 44 at opposite ends thereof in which twin rudder elements 45 are adapted to be secured by means of dowel pins 46 carried thereon. Likewise if desired a central rudder 47 may be utilized either in place of the spaced twin rudders 45 or in addition thereto, the central rudder element 47 carrying similar dowel pins for being received in the upper recesses on the stabilizer 41.

Again for the purpose of simplicity in manufacture, the surface of the stabilizer and of the rudders may be cut by the same female cutter which forms the wing surface 10.

Figure 2:
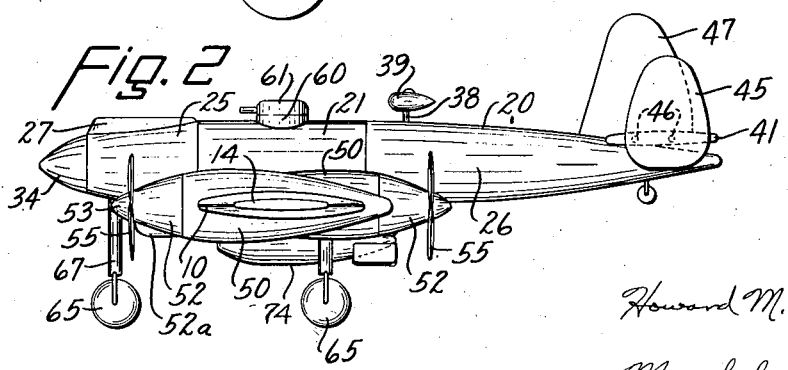
Fig. 2 is a side elevational view of the same.

By reference to Figs. 2 and 5 it will be seen that upon loosening the nose part 34 and separating the body sections, the middle section 21 can be rotated through 180° to convert the model from a low-wing monoplane such as shown in Fig. 2, to the high-wing monoplane as shown in Fig. 5. Such change can be accomplished while retaining the wing in the same relationship, the dowel pins 23 being received in the apertures on the opposite sides of the wing in such case. Likewise the parts may be assembled with the wing not only shifted from low to high position, but likewise inverted end for end, or rotated through 180°. A wide range of different arrangements and combinations can thus be secured through the use of the same parts.

Engine nacelles 50 are provided which are internally recessed as shown at 51 in Fig. 7, such recess having the same contour as the cross-section of the wing. Since the wing is symmetrical, and the recess 51 is likewise symmetrical, it will be apparent that the nacelle 50 can be assembled on the wing in either of two positions relatively inverted with respect to each other, and may likewise be assembled on the wing with its position reversed, to simulate either a tractor or pusher type of installation.

The construction of the nacelle includes the main recessed part already described and a separable forward section 52 simulating in the case of Fig. 7 an in-line or liquid cooled engine with a projection 52a simulating a cooling radiator element. A nose piece 53 carrying thereon a shaft 54 is slidable through the section 52 providing for receiving a propeller element 55 thereon. The shaft 54 is sufficiently elongated so that when the nacelle is assembled over the wing, the reduced end portion 56 thereof is adapted to pass into the main body 50 of the nacelle and to be received in a recess 57 provided on the leading and trailing edge of the wing so that the nacelle can be secured in either relationship desired.

In place of the engine simulating part 52 being shaped as a liquid cooled engine, it may be shaped in the form of a radial or air cooled engine 58, one of which parts is shown as a pusher element on the assembly of Fig. 3. By the provision of sets of both types of engine parts, the entire engines and nacelles may be assembled simulating single or multi-engine planes of either the radial or liquid cooled type.

A removable gun turret part 60 is adapted to be secured by means of a connecting dowel pin to the main body section 21. The upper part of the turret 61 (see Fig. 2) is separate from the lower part and is mounted on a central pin so that it can swing around in a complete circle. If desired the forward body section 25 may be formed with a raised element 27 simulating the cabin cockpit.

To provide landing wheel assemblies, a wheel element 65 is shown, the wheel being supported by means of a pair of bent wires 66 from a landing wheel strut 67. The strut is provided with two recessed apertures 68 and a cross slot 69 adapted to receive and guide the ends of the wires 66 when assembled in the manner shown in Fig. 8. Such assembly provides for securely retaining the wheel against movement, and permitting ready disassembly thereof where desired. The upper end of the strut 67 is notched as shown at 70 to be received in corresponding apertures 71 provided in the wing, when the assembly is arranged as a low-wing plane, and in the body part 21, as shown at 72 in Fig. 3 when assembled as a high-wing plane. Wires 73 extend across the apertures to be received within notches 70 thereby preventing the struts from turning. A similar strut may be used to removably support a bomb simulating element 74 beneath the wing or body of the plane.

Fig. 9 shows a somewhat modified arrangement in which the landing wheel strut 75 projects downwardly from its supporting surface at an angle of about 45°, the supporting wires 76 being suitably shaped to support the landing wheel 65 in this position.

Fig. 6 shows a construction in which the body parts are secured together by a modified fastening means comprising a dowel rod 80 secured to the nose piece 81 and having a threaded end 82 adapted to be received in a nut 84 suitably secured in place in the rear body section 26 as by means of glue or the like. With this arrangement the use of the inserted locking pin 38 is unnecessary, and a firm and tight assembly of the body parts is attained.

Referring now to Figs. 11 and 12, there is shown a modified arrangement comprising a pair of body parts 90 and 91 which are separable but adapted to be combined to form the central body part of the plane. Each of the parts is recessed as shown at 92, the recesses being similar in each of the two body parts, and together forming a combined recess of substantially the same shape and contour as the wing surface.

As shown in Fig. 12 such recesses may be located adjacent one side of the body, leaving a reentrant portion 93, or they may be formed centrally of the body parts 90a and 91a as shown in Fig. 14. In both cases upon assembly of the two body sections over the wing, shown at 94, the wing is securely held in place through the clamping action of the body parts. Removable tip sections 95 are constructed and arranged for assembly on the main body section as before described. A forward body section 96 and a rear body section 97 are provided and arranged to be assembled upon the central body sections, dowel pins 98 and corresponding slots 99 being provided as described above making it possible to assemble the central body sections in either of two positions rotated 180° relative to each other with respect to both the forward and rear body sections. If desired such pins 98 and holes 99 may be dispensed with in this construction since the nut and bolt action holds all parts in any desired position by friction.

To retain the parts in assembled position, a nose piece 100 is provided which is formed with a rearwardly extending stem 101 adapted to be threadedly received within a nut 102 fixed in the rear body section 97. In the arrangement shown in Fig. 14, such stem 101a passes through a central aperture suitably formed in wing 94a. An open cross slot 103 in the end of nose piece 100 provides for receiving a screwdriver or a coin for tightening the stem into the nut.

It will thus be seen that the construction in Fig. 14 simulates a mid-wing type plane, while the construction shown in Fig. 12 may be used to simulate both a low-wing and a high-wing type plane by suitable inversion of the body parts. The arrangement of the tail surfaces shown generally at 104 in both forms is essentially the same as described above. The same is true as to the landing wheel assembly as shown at 105, apertures being suitably provided in both sections 90, 91 and 96 as well as in the wing 95, to receive the landing gear for the purpose of simulating either the conventional type of gear or tricycle gear. Thus the body parts 90 and 91 of Figs. 11 and 12 may be inverted with respect to the remaining body parts 96 and 97 and may likewise receive the wing in any of the different relations described above, providing for the assembling of the parts into representations of a number of different types of planes.

Fig. 13 shows an arrangement of engine nacelle indicated at 110 adapted to be received over the wing section 95 and having split recesses 111 adjacent one side thereof corresponding to the shape of the wing, and suitable for use with the construction as shown in Fig. 12 simulating either the low or high-wing type depending upon whether it is assembled above or below the wing. It will be understood in the case of the arrangement in Fig. 13 that the two main nacelle sections may be assembled over the wing in relatively inverted relation with respect to each other, and that the nacelles can also be assembled over the wing to simulate either pusher or tractor type planes.

A rearwardly extending boom 112 is also illustrated in Fig. 13, such part being threaded to receive the locking shaft 113 carried by the nose element 114, such element being spaced from engine part 115 to provide a space for receiving the propeller 116. As before the engine part 115 simulating a liquid cooled engine may be replaced by a piece of the same axial length but contoured to simulate an air cooled engine. Locking pins 117 may be used to provide for assembly and retention of the several parts of the nacelle body in definite relation to each other. The rear end of the boom is formed with an inwardly opening recess 118 within which there are positioned spaced dowel pins 119 providing for the assembly of the stabilizer 104 therebetween.

Fig. 15 shows a corresponding engine nacelle

110' in which the recesses 111' are located centrally so that when assembled it will be located midway of the wing. The nacelle merely has a rounded end piece 112' in place of the rearwardly extending boom in which the attaching nut is positioned. Locking shaft 113' carried by nose piece 114' provides for detachably securing together the nacelle and the radial engine part 115'. Parts in Fig. 15 corresponding to those in Fig. 13 are numbered with prime reference characters.

Referring now to Figs. 16 and 17 a further assembly of parts is shown with a wing indicated at 120 of the construction previously described. The body comprises the two central sections 122 and 123 which are suitably recessed as shown at 124 to be received over the wing, the arrangement shown being a high-wing plane. A radial engine part 125 is positioned in front of the forward body section, and a rounded end piece 126 is located at the rear, such piece 126 likewise serving as a nose element in the event that the assembly is made to simulate a pusher type plane. These parts are assembled by means of the rod 127 which passes through all of the body parts and secures them firmly together in the desired assembled relation upon the wing in the manner previously described.

Side booms 130 internally recessed with closed contour to the shape of the wing surface are arranged to be received over the wing, extending rearwardly therefrom where they are provided with a recessed slot 131 in which are located dowel pins 132 adapted to be attached to the stabilizer 133. Twin rudder elements 134 are located on the stabilizer in the manner previously described and secured in apertures on the outer side of the booms by means of dowel pins 135.

Struts 138 are detachably received in apertures in the assembled body sections 122, 123, similarly spaced apertures being provided in the wing section so that a low-wing plane may likewise be simulated, and extend downwardly at an angle of approximately 45° therefrom, having attached to their lower ends the pontoons 140. It will thus be seen that with this arrangement an entirely different type of plane, namely, a hydroplane is simulated, and it will be clear that a great many types of such pontoon-equipped planes can be simulated with the parts as herein described.

The invention therefore provides a novel and highly instructive set of toy airplane parts which with a relatively limited number of parts provides for the assembling of a substantial number of types of planes, each of which is approximately in scale, and an accurate representation of either existing types of planes or those which might be constructed in the future. The construction of the parts is rendered relatively simple so that they can be readily produced in large scale production as a continuous operation, either by cutting out wood sections, or through the use of molded parts or the like. Further the parts are substantial and rugged, the models when assembled being able to withstand rather severe handling without damage, making it an attractive and useful combination of parts having great interest and educational value.

Reference is made to applicant's copending application Serial No. 397,567, filed June 11, 1941, which also relates to a set of integrated model airplane parts.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A combination set of integrated model airplane parts comprising an elongated body part, a part representing an engine adapted to be assembled with said body part to simulate either a pusher or a tractor type plane, a symmetrical wing section separate from said body section and adapted to be received thereon in either of two positions relatively inverted with respect to each other, means for detachably securing said engine part either in front of or at the rear of said body part, and means for securing said wing section upon said assembled engine and body parts in both of the assemblies thereof.

2. A combination set of integrated model airplane parts comprising a body part, a wing section symmetrical in cross-section from the leading edge to the trailing edge, means for securing said wing section and said body part together, a nacelle having a recess formed therein corresponding to the shape of the wing and adapted to be telescopically received over said wing in either of two positions relatively reversed with respect to each other simulating a tractor or a pusher engine.

3. A combination set of integrated model airplane parts comprising a body part, a wing section symmetrical in cross-section from the leading to the trailing edge thereof, said body part having a recess the contour of which corresponds with that of the wing surface providing for receiving the wing in either of two positions relatively inverted with respect to each other, means for detachably securing said wing section and said body part together in either of said two relations, a nacelle having a recess the contour of which corresponds with that of the wing surface and adapted to be telescopically received over said wing in either of two positions relatively reversed with respect to each other simulating a tractor or a pusher engine.

4. The combination of claim 3 in which the nacelle recess is located at one side thereof providing for receiving the nacelle either above the wing or below the same.

5. A combination set of integrated model airplane parts comprising a body part, a wing section symmetrical in cross-section from the leading to the trailing edge thereof, a nacelle having a recess therein corresponding to the shape of the wing and adapted to be received over said wing in different positions relatively inverted with respect to each other, a boom adapted to extend rearwardly from said nacelle, a tail member supported from said boom, and means for detachably securing said nacelle and said wing section together in each of said two positions.

HOWARD M. McCOY.